(12) United States Patent
Trask et al.

(10) Patent No.: US 7,503,301 B2
(45) Date of Patent: Mar. 17, 2009

(54) THROTTLE POSITION CONTROL DURING AN ENGINE START

(75) Inventors: Nate R. Trask, Dearborn, MI (US); Gang Song, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/867,061

(22) Filed: Oct. 4, 2007

(65) Prior Publication Data

US 2008/0022957 A1    Jan. 31, 2008

Related U.S. Application Data

(62) Division of application No. 11/224,465, filed on Sep. 12, 2005, now Pat. No. 7,296,550.

(51) Int. Cl.
*F02D 41/06* (2006.01)

(52) U.S. Cl. .............................. 123/179.18

(58) Field of Classification Search ........... 123/179.18, 123/182.1, 90.15, 399
See application file for complete search history.

(56) References Cited

U.S. PATENT DOCUMENTS

| | | | |
|---|---|---|---|
| 4,700,684 A | 10/1987 | Pischinger et al. | |
| 4,791,902 A * | 12/1988 | Ishikawa et al. | 123/399 |
| 5,211,146 A | 5/1993 | Pischinger | |
| 5,746,183 A | 5/1998 | Parke et al. | |
| 5,950,582 A | 9/1999 | Stein | |
| 6,039,026 A | 3/2000 | Shiraishi et al. | |
| 6,055,948 A | 5/2000 | Shiraishi et al. | |
| 6,092,496 A | 7/2000 | Bhargava et al. | |
| 6,321,731 B1 | 11/2001 | Russ et al. | |
| 6,334,417 B1 | 1/2002 | Salber et al. | |
| 6,338,331 B1 * | 1/2002 | Watanabe et al. | 123/399 |
| 6,394,051 B1 | 5/2002 | Filipe et al. | |
| 6,405,706 B1 | 6/2002 | Hammoud et al. | |
| 6,412,455 B1 | 7/2002 | Ogiso et al. | |
| 6,439,175 B2 | 8/2002 | Arai et al. | |
| 6,505,594 B1 * | 1/2003 | Katayama et al. | 123/179.18 |
| 6,513,493 B1 * | 2/2003 | Robichaux et al. | 123/399 |
| 6,681,741 B2 | 1/2004 | Majima et al. | |
| 6,729,304 B2 | 5/2004 | Fujiki et al. | |
| 6,814,035 B2 | 11/2004 | Eiraku | |
| 6,863,048 B2 | 3/2005 | Burkhard et al. | |
| 6,938,598 B1 | 9/2005 | Lewis et al. | |
| 6,978,761 B2 | 12/2005 | Meyer | |
| 7,011,075 B2 | 3/2006 | Lewis | |
| 7,017,539 B2 | 3/2006 | Lewis et al. | |

(Continued)

OTHER PUBLICATIONS

U.S. Appl. No. 10/805,636.

(Continued)

*Primary Examiner*—Stephen K Cronin
*Assistant Examiner*—Arnold Castro
(74) *Attorney, Agent, or Firm*—Allan J. Lippa; Alleman Hall McCoy Russell & Tuttle LLP

(57) ABSTRACT

A method for improving engine starting for an engine having a variable event valvetrain is described. According to one aspect of the description, valve timing during a start can be set so that combustion stability and emissions may be improved.

7 Claims, 9 Drawing Sheets

U.S. PATENT DOCUMENTS

| | | |
|---|---|---|
| 7,021,289 B2 | 4/2006 | Lewis et al. |
| 7,028,650 B2 | 4/2006 | Lewis et al. |
| 7,031,821 B2 | 4/2006 | Lewis et al. |
| 7,032,545 B2 | 4/2006 | Lewis et al. |
| 7,047,126 B2 | 5/2006 | Lewis |
| 7,055,483 B2 | 6/2006 | Lewis et al. |
| 7,063,062 B2 | 6/2006 | Lewis et al. |
| 7,066,121 B2 | 6/2006 | Michelini et al. |
| 7,069,720 B2 | 7/2006 | Strayer et al. |
| 7,069,909 B2 | 7/2006 | Pozar et al. |
| 7,079,935 B2 | 7/2006 | Lewis et al. |
| 7,107,946 B2 | 9/2006 | Lewis et al. |
| 7,107,947 B2 | 9/2006 | Lewis et al. |
| 7,128,043 B2 | 10/2006 | Lewis et al. |
| 7,128,687 B2 | 10/2006 | Lewis |
| 7,140,355 B2 | 11/2006 | Michelini et al. |
| 7,165,391 B2 | 1/2007 | Lewis |
| 7,194,993 B2 | 3/2007 | Lewis et al. |
| 2003/0233990 A1* | 12/2003 | Ogawa ............... 123/90.15 |
| 2006/0231051 A1* | 10/2006 | Winstead et al. ......... 123/90.11 |

OTHER PUBLICATIONS

U.S. Appl. No. 10/805,654.

* cited by examiner

END OF EXHAUST STROKE

THROTTLE POSITION CONTROL DURING AN ENGINE START

The present application is a divisional of U.S. patent application Ser. No. 11/224,465, now U.S. Pat. No. 7,296,550 titled STARTING AN ENGINE HAVING A VARIABLE EVENT VALVETRAIN, filed Sep. 12, 2005, the entire contents of which are incorporated herein by reference in their entirety for all purposes.

FIELD

The present description relates to a method for controlling engine starting for an internal combustion engine having an electronic throttle.

BACKGROUND

One method to control an electronic intake throttle of an internal combustion engine is to move the throttle plate from a closed position at key-on to a partially open position. Opening the throttle from a closed position allows more air to enter the engine during engine cranking and run-up. Opening the throttle also allows an engine controller to adjust engine fuel so that engine torque is increased without having to run the engine rich of stoichiometry. During a start, throttle position can also be adjusted in relation to time so that the engine air amount can be varied as the engine warms up.

The above-mentioned method can also have several disadvantages. For example, engine air flow is adjusted in response to the amount of time since start rather than in response to physical engine conditions. In other words, time since start is used to adjust the throttle as a surrogate for knowledge of actual engine operating conditions. As a result, starting emissions and intake manifold pressure control can vary more than is desired.

The inventors herein have recognized the above-mentioned disadvantages and have developed a method of controlling intake valve timing that offers substantial improvements.

SUMMARY

One embodiment of the present description includes a method to start an internal combustion engine, the method comprising: adjusting the position of a throttle in response to a number of counted engine events, said throttle located upstream of an intake manifold. This method overcomes at least some of the limitations of the previously mentioned method.

An intake throttle can be positioned in response to physical engine events to improve intake manifold pressure control and to reduce engine emissions. For example, throttle position can be adjusted in response to a number of cylinder intake or combustion events. Intake manifold pressure is related to flow into the intake manifold and flow out of the intake manifold. And flow out of the intake manifold is related to air drawn into cylinders during induction events. Therefore, if the throttle is adjusted in response to events that evacuate the manifold then flow into the manifold can be adjusted to be in synchronization with events that evacuate the manifold. As a result, intake manifold pressure can evolve closer to desired intake manifold pressure.

The present description may provide several advantages. For example, the approach may reduce engine hydrocarbon emissions, improve combustion stability, and reduce cylinder misfires. Furthermore, engine run-up may be more consistent over a wider range of engine operating conditions since flow through the cylinders can be expected to vary with engine operating conditions.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
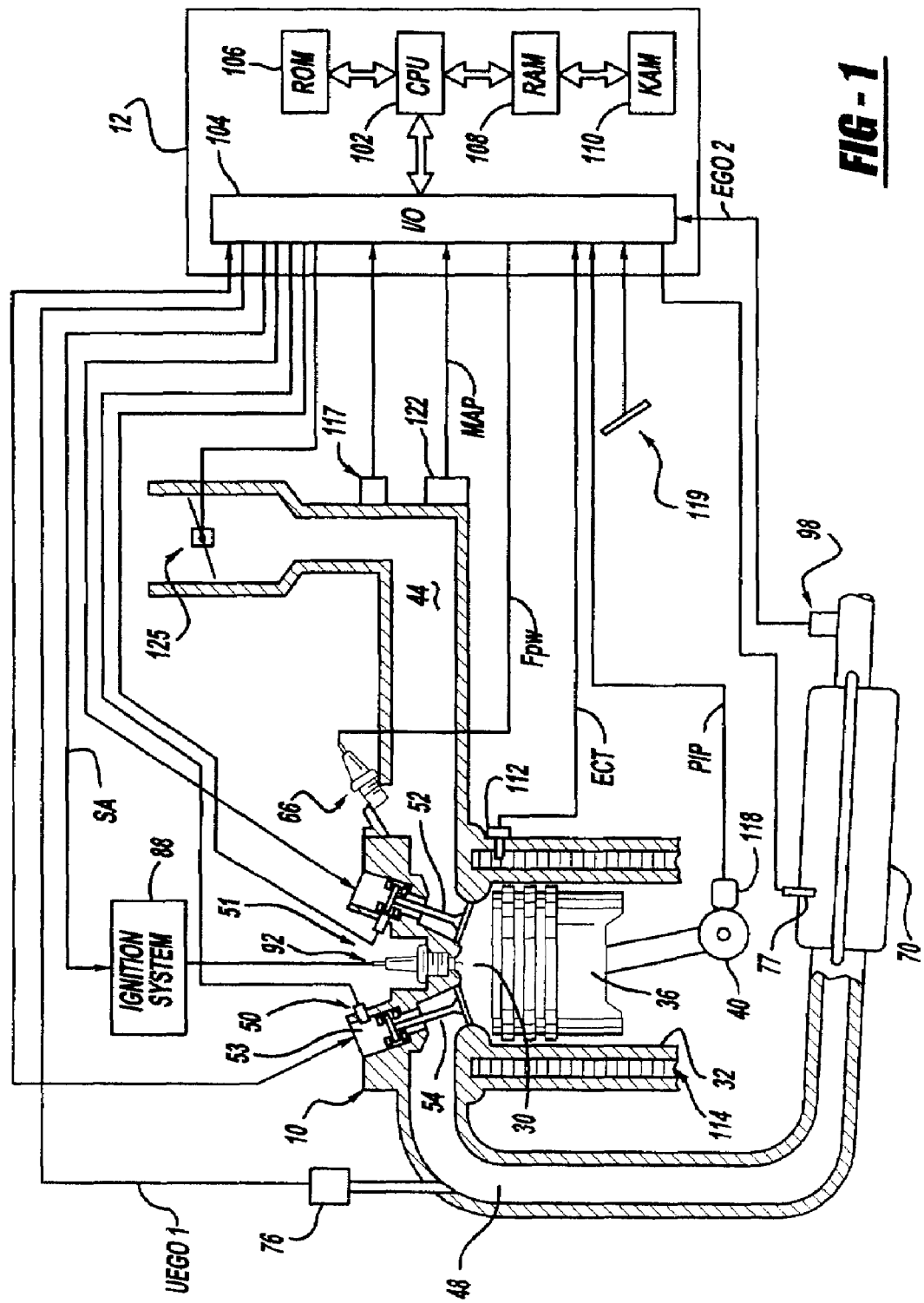
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, the intake 52 or exhaust 54 valve may be mechanically actuated via a camshaft, for example. Further, a mechanical device may be used to control valve lift and/or valve timing. Valve actuator armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 73 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: brake boost pressure (not shown); fuel vapor canister hydrocarbon concentration sensor (not shown); engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from sensor 118 sensing crankshaft 40 position. Sensor 118 may be a variable reluctance, Hall effect, optical, or magneto-resistive sensor. Alternatively, a camshaft position sensor may also be provided and may be used to determine engine position. In a preferred aspect of the present description, engine position sensor 118 produces a predetermined number of equally spaced pulses every revolution of the crankshaft from which engine speed (RPM) can be determined.

Figure 2A:
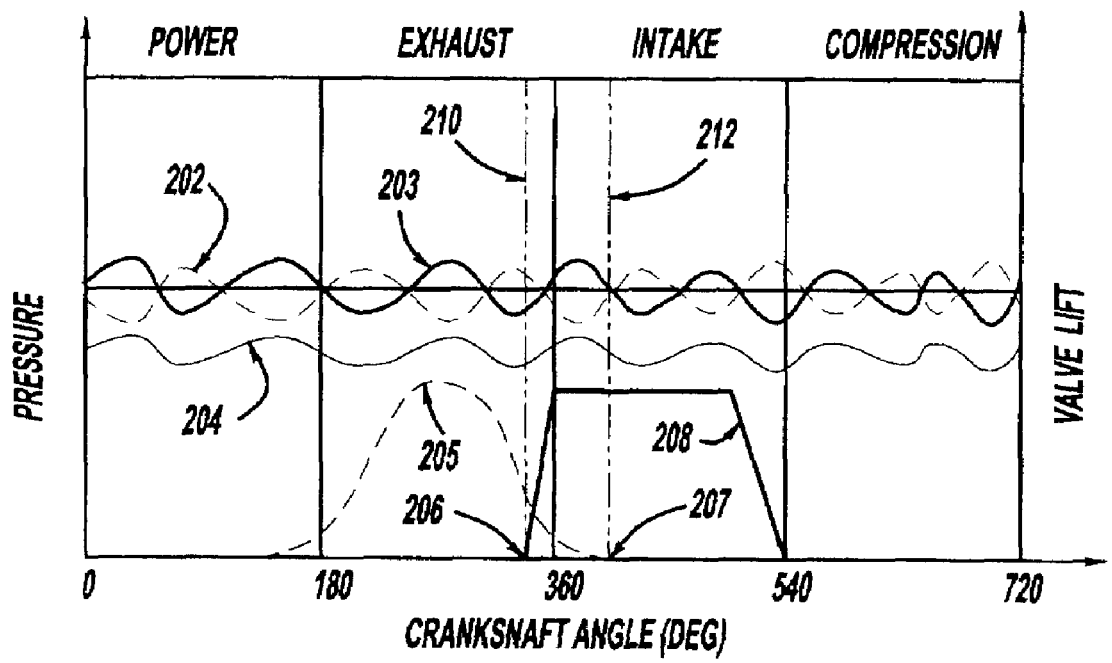
FIG. 2a is an example timing diagram showing intake and exhaust manifold pressure relative to intake and exhaust valve timing.

Referring to FIG. 2a, an example timing diagram that shows intake and exhaust valve timing relative to intake and exhaust port pressures. The x-axis represents engine position and is displayed in units of crankshaft degrees. Two y-axes are also shown, the left indicating pressure and the right indicating valve lift amount. The figure depicts a part load operating condition at a constant engine speed. However, the illustrated behavior can be observed during dynamic engine operating conditions and is therefore not intended to limit the scope or breadth of the description.

Continuing with FIG. 2a, line 202 illustrates exhaust port pressure. The exhaust pressure is shown fluctuating about an average pressure as the engine rotates and cylinder contents are pumped into the exhaust port and manifold. The intake port pressure is represented by line 203 and also fluctuates as the engine rotates and air is drawn from the intake port and manifold into the cylinder. Further, the amplitude of the pressure fluctuation can increase if the intake or exhaust system is excited at its natural frequency, thereby setting the system into resonance. In this example, the intake and exhaust pressures are shown approximately 180° out of phase. That is, when one pressure reaches a peak the other pressure reaches a valley. If intake and exhaust valves are simultaneously open during a period when one port pressure is higher than the other, then the pressure differential can cause flow from one port to the other. Line 204 represents intake port pressure when engine throttling is increased beyond the level shown in line 203. Intake manifold pressure may be lowered by reducing the throttle opening amount of throttle 125, for example. Further, under some conditions, a throttle may be used to lower manifold pressure, but valve timing may be changed so that an equivalent cylinder air charge may inducted into a cylinder. For example, a cylinder air charge produced at a first throttle opening amount, an opening amount greater than a second throttle opening amount, may be produced at the second throttle opening amount by increasing the intake valve opening duration or by adjusting the valve opening timing. Of course, this relationship holds better when the engine is operated at a larger throttle opening and shorter duration valve timings and then transitions to a smaller throttle opening and longer duration valve timings.

Cylinder valve timing is shown by lines 205 and 208. Line 205 represents the profile of a mechanically actuated exhaust valve while line 208 represents an opening profile of an electrically actuated intake valve. Location 206 indicates intake valve opening and location 207 indicates the exhaust valve closing location. The intake and exhaust valves are open during respective intake and exhaust strokes, but the exhaust valve opening extends into the intake stroke and the intake valve opening extends into the exhaust stroke. By extending the valve opening into the adjacent stroke, a period of valve overlap can be created around top-dead-center of the intake stroke. Line 210 is used to illustrate the beginning of valve overlap and line 212 illustrates the end of valve overlap. During the period of valve overlap a pressure differential from one port to the other can cause flow between the ports. For example, if pressure in the intake port is higher than pressure in the exhaust port during valve overlap, then the contents of the intake port may be pulled through to the exhaust port. Conversely, if pressure in the exhaust port is higher than pressure in the intake port during valve overlap, then the contents of the intake port may be pulled through to the intake port.

It can be seen for at least a portion of the valve overlap period (between 210 and 212) that the intake pressure is shown at a higher pressure level than the exhaust pressure. The pressure differential across the cylinder can drive flow from the intake port to the exhaust port. Therefore, it is possible to draw at least a portion of the air-fuel mixture from the intake port directly to the exhaust port without having combusted the mixture. As mentioned above, this can reduce the efficiency of the engine and increase emissions of hydrocarbons. On the other hand, when the engine is sufficiently throttled upstream of the intake manifold the pressure in the intake manifold may be lower than the exhaust manifold pressure. As a result, residuals may be pulled from the exhaust port into the cylinder, thereby allowing additional residuals to flow into a subsequent cylinder mixture. By controlling the intake manifold pressure and valve overlap duration, scavenging between the intake manifold and exhaust manifold can be controlled.

Figure 2B:
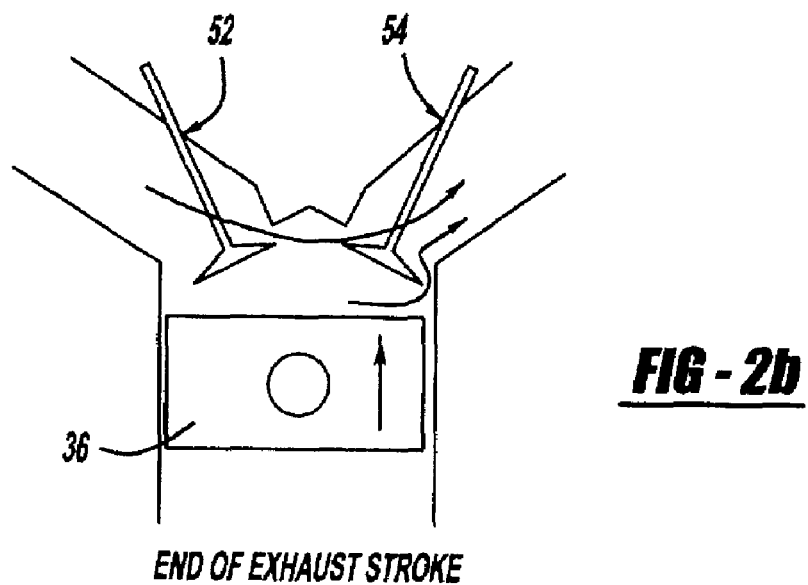
FIG. 2b is a schematic diagram of a cylinder approaching the end of an exhaust stroke.

Referring to FIG. 2b, a schematic diagram of a cylinder approaching the end of an exhaust stroke is shown. Intake valve 52 and exhaust valve 54 are shown open and in an overlap interval. If pressure in the intake manifold is higher than that in the exhaust manifold then some portion of a non-combusted air-fuel mixture may be drawn from the intake port to the exhaust port as illustrated by the two directional arrows, thereby increasing hydrocarbon emissions. In contrast, if the exhaust manifold pressure is higher than the intake manifold pressure exhaust gases may flow from the exhaust port to the intake port in the direction opposite to the arrows. It may be useful to draw residuals from the exhaust manifold to the intake manifold so that internal EGR may be used to control the combustion process in the cylinder. However, drawing an air fuel mixture from the intake manifold to the exhaust manifold may increase fuel consumption and emissions and therefore may not be as desirable.

Figure 3:
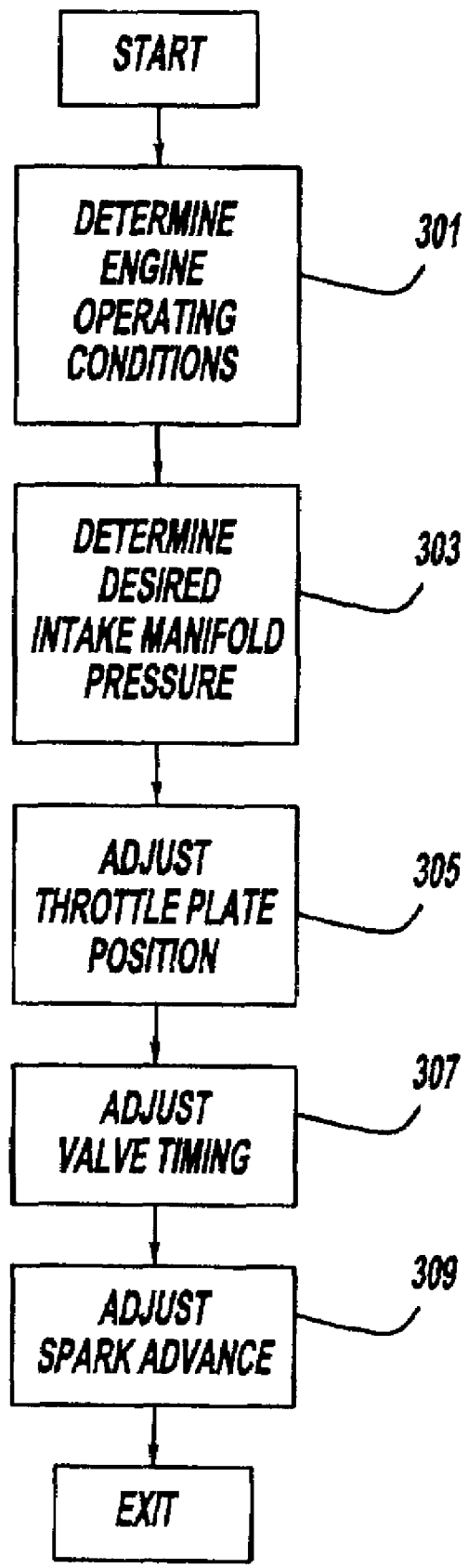
FIG. 3 is a flow chart of an example method to control intake manifold pressure for an engine having a variable event valvetrain.

Referring to FIG. 3, a flow chart of an example method to control intake manifold pressure for an engine having a variable event valvetrain is shown. In step 301, engine operating conditions may be determined by interrogating sensor outputs or by inference. For example, barometric pressure can be determined by sensing manifold pressure sensor 122 before engine rotation begins. Furthermore, engine speed, engine torque demand, engine inlet air temperature, engine coolant temperature, cylinder air charge amount, and catalyst temperature may be determined or inferred by interrogating respective sensors. The routine proceeds to step 303.

In step 303, a desired manifold pressure can be determined. An engine operating in a vehicle can have a variety of sources that may make different operational demands on the engine. For example, an operator can demand an engine torque amount by depressing accelerator pedal 119 or a control algorithm can request an engine operating point that increases fuel economy, adjusts brake boost pressure, reduces intake or exhaust manifold scavenging, increases engine or catalyst heating, adjusts crankcase ventilation, maintains a level of combustion stability, or changes volumetric efficiency via valve timing. These operational demands may involve adjusting the intake manifold pressure to meet the requested demand. When various sources compete for control of manifold pressure one way to arbitrate between them is to select the request that demands the lowest manifold pressure so that several of the requests may be simultaneously served. Systems requesting manifold pressure may use predetermined tables or functions to select a desired intake manifold pressure. For example, canister purge may request a manifold pressure based on fuel tank pressure and time since the engine was started, for example.

In one example, it may be desirable to reduce scavenging between the intake and exhaust manifolds. As mentioned above, scavenging from the intake manifold to the exhaust manifold can reduce engine power, increase hydrocarbon emissions, and reduce engine efficiency. On the other hand, scavenging from the exhaust manifold to the intake manifold may result in misfires if levels of EGR are higher than a particular amount. Since scavenging may be related to manifold pressure and to the frequencies that excite mechanical system resonances, as illustrated by FIG. 2a, scavenging may be controlled by scheduling manifold pressure as a function of engine speed and requested engine torque, for example.

In another example, manifold pressure can be scheduled to improve fuel efficiency by selecting a manifold pressure that provides an increased net engine work. That is, manifold pressure can be selected where the sum of indicated efficiency and engine pumping work produces a higher level of net engine work. At some operating conditions engine pumping work may be reduced by opening the throttle so that intake manifold pressure is at or near atmospheric pressure. At other engine operating conditions it may be desirable to lower intake manifold pressure so that indicated efficiency may be improved.

In yet another example, intake manifold pressure can be determined in response to engine temperature and/or catalyst temperature. When catalyst temperature is low the manifold pressure may be set near atmospheric pressure so that heat and mass flow may be increased to the catalyst. Alternatively, manifold pressure may be lowered to improve combustion stability during operating states where the catalyst and engine temperature are low. Further still, if a catalyst is at operating temperature and the engine temperature is low, manifold pressure can be reduced and spark advanced so that heat of combustion can be readily transferred to the engine and to engine coolant.

In still another example, intake manifold pressure may be scheduled in accordance to demands of peripheral systems such as brake boost, fuel vapor purge, and/or crankcase ventilation. These systems may request a specific manifold pressure that induces a certain flow rate from the respective system to the intake manifold or they may request a pressure that can exert a desired force on an actuator, for example. The routine proceeds to step 305.

In step 305, the throttle plate can be adjusted to help control the intake manifold pressure. In one example, throttle position can be determined from the desired air flow rate through the engine and pressure drop across the throttle. The pressure drop across the throttle can be determined by subtracting the desired manifold pressure from the ambient air pressure. A table or function can be used to describe the relationship between throttle angle, pressure drop across the throttle, and throttle flow. For example, the x-axis index of a throttle angle table can be a pressure drop across the throttle and the y-axis index can be the desired air flow through the throttle. The table output is throttle angle in degrees which corresponds to a throttle area. In addition, the throttle plate position may be corrected by determining an error amount between actual and desired manifold pressure. The manifold pressure error can then be used by a proportional/integral controller to open or close the throttle plate so that the manifold pressure error may be reduced. The routine proceeds to step 307.

In step 307, valve timing can be adjusted. In one example, the method described in U.S. patent application Ser. No. 10/805,642 can be used to determine the intake valve timing and is hereby fully incorporated by reference. Specifically, a driver brake torque demand can be interpreted from pedal position sensor 119. The engine brake torque command can be transformed into individual cylinder pressure values and then into individual cylinder air and fuel amounts. Valve timing can be determined from the individual cylinder air amounts.

The cylinder data can be transformed into cylinder pressure based on the following regression equations A and B:

$$PMEP_{Act}=C_0+C_1 \cdot V_{IVO}+C_2 \cdot V_{EVC}+C_3 \cdot V_{IVC\text{-}IVO}+C_4 \cdot N \qquad \text{Equation A:}$$

Where $PMEP_{Act}$ is pumping mean effective pressure, $C_0$-$C_4$ are stored, predetermined, polynomial coefficients, $V_{IVO}$ is cylinder volume at intake valve opening position, $V_{EVC}$ is cylinder volume at exhaust valve closing position, $V_{IVC}$ is cylinder volume at intake valve closing position, $V_{IVO}$ is cylinder intake valve opening position, and N is engine speed. Valve timing locations IVO and IVC can be based on the last set of determined valve timings.

$$FMEP_{Act}=C_0+C_1 \cdot N+C_2 \cdot N^2 \qquad \text{Equation B:}$$

Where $FMEP_{Act}$ is friction mean effective pressure, $C_0$-$C_2$ stored, predetermined polynomial coefficients, and N is engine speed.

The following describes further exemplary details for the cylinder pressure regression and interpolation schemes. A one dimensional function can be used to store friction and pumping polynomial coefficients for cylinders. The data taken to determine the coefficients can be collected at a sufficient number of engine speed points to provide the desired torque loss accuracy. Coefficients can be interpolated between locations where no data exists. For example, data can be collected and coefficients are determined for an engine at engine speeds of 600, 1000, 2000, and 3000 RPM. If the engine is then operated at 1500 RPM, coefficients from 1000 and 2000 RPM can be interpolated to determine the coefficients for 1500 RPM.

The losses based on pressure can then be transformed into torque by the following equations:

$$\Gamma_{\text{friction\_total}} = FMEP_{Act} \cdot \frac{V_D}{4 \cdot \pi} \cdot \frac{N/m^2}{(1 \cdot 10^{-5} \text{ bar})}$$

$$\Gamma_{\text{pumping\_total}} = PMEP_{Act} \cdot \frac{V_D}{4 \cdot \pi} \cdot \frac{N/m^2}{(1 \cdot 10^{-5} \text{ bar})}$$

The parameter $V_D$ represents the displacement volume of engine cylinders. In addition, the fuel and air amount used by an engine operating with less than a full complement of cylinders (e.g., six cylinders of an eight cylinder engine) may also be determined by including the pumping and friction pressures of deactivated cylinders.

The desired indicated mean effective pressure (IMEP) for each cylinder can be determined, for example via the equation:

$$IMEP_{cyl}(\text{bar}) = \left( \frac{\Gamma_{brake} - (\Gamma_{\text{friction\_total}} + \Gamma_{\text{pumping\_total}} + \Gamma_{\text{accessories\_total}})}{\text{Num\_cyl}} \right) *$$
$$\frac{4\pi}{V_D} * \frac{(1*10^{-5} \text{ bar})}{N/m^2} \cdot SPKTR$$

Where Num_cyl is the number of active cylinders, $V_D$ is the displacement volume of active cylinders, SPKTR is a torque ratio based on spark angle retarded from minimum best torque (MBT) (i.e., the minimum amount of spark angle advance that produces the best torque amount). Additional or fewer polynomial terms may be used in the regression based on the desired curve fit and strategy complexity. Alternatively, different estimation formats can also be used. The term SPKTR can be based on the equation:

$$SPKTR = \frac{\Gamma_{\Delta SPK}}{\Gamma_{MBT}}$$

Where $\Gamma_{\Delta SPK}$ is the torque at a spark angle retarded from minimum spark for best torque (MBT), $\Gamma_{MBT}$ is the torque at MBT. In one example, the actual value of SPKTR can be determined from a regression based on the equation:

$$SPKTR = C_0 + C_1 * \Delta_{spark}^2 + C_2 * \Delta_{spark}^2 * N + C_3 * \Delta_{spark}^2 * IMEP_{MBT}$$

Where $C_0$-$C_3$ are stored, predetermined, regressed polynomial coefficients, N is engine speed, and $IMEP_{MBT}$ is IMEP at MBT spark timing. The value of SPKTR can range from 0 to 1 depending on the spark retard from MBT.

An individual cylinder fuel mass can be determined, in one example, for each cylinder by the following equation:

$$M_f = C_0 + C_1 * N + C_2 * AFR + C_3 * AFR^2 + C_4 * IMEP + C_5 * IMEP^2 + C_6 * IMEP * N$$

Where $M_f$ is mass of fuel, $C_0$-$C_6$ are stored, predetermined, regressed polynomial coefficients, N is engine speed, AFR is the air-fuel ratio, and IMEP is indicated mean effective pressure. Additional or fewer polynomial terms may be used in the regression based on the desired curve fit and strategy complexity.

In one example, a predetermined air-fuel mixture (based on engine speed, temperature, and load), with or without exhaust gas sensor feedback, determines a desired air-fuel ratio. The determined fuel mass can be multiplied by the predetermined desired air-fuel ratio to determine a desired cylinder air amount. The desired mass of air can be determined from the equation:

$$M_a = M_f AFR$$

Where $M_a$ is the desired mass of air entering a cylinder, $M_f$ is the desired mass of fuel entering a cylinder, and AFR is the desired air-fuel ratio.

Exhaust valve opening (EVO), intake valve open (IVO), and exhaust valve close (EVC) timing can be determined from center point of overlap and desired overlap. Center point of intake and exhaust valve overlap is a reference point, in crank angle degrees, from where IVO and EVC are determined. Overlap is the duration, in degrees, that intake valves and exhaust valves are simultaneously open. IVO and EVC can be determined by the following equations:

$$IVO = CPO - \frac{OL}{2}$$

$$EVC = CPO + \frac{OL}{2}$$

Where CPO is center point of overlap and OL is overlap. The location of CPO and OL can be predetermined and may be stored in a table that is indexed by engine speed and air mass entering a cylinder. The amount of overlap and the center point of overlap can be selected based on desired exhaust residuals and engine emissions.

Exhaust valve opening (EVO) can also be determined from a table indexed by engine speed and air mass entering a cylinder. The predetermined valve opening positions can be empirically determined and may be based on a balancing engine blow down (i.e., exhaust gas evacuation) and lowering expansion losses. Further, the valve timings may be adjusted based on engine coolant or catalyst temperature.

Since EVO, EVC, and IVO are scheduled in one example (i.e., predefined looked-up locations) intake valve closing (IVC) can be determined based on these predetermined locations and the desired mass of air entering a cylinder. The desired mass of air entering a cylinder can be translated into a cylinder volume by the ideal gas law:

$$V_a = \frac{M_a \cdot R \cdot T}{P}$$

Where $V_a$ is the volume of air in a cylinder, $M_a$ is a desired amount of air entering a cylinder, R is a ideal gas constant, T is the intake manifold temperature, and P is the intake manifold pressure from step 303. By using the ideal gas law, individual cylinder volumes can be adjusted to provide the desired cylinder air amount at altitude. Furthermore, an altitude factor may be added to regression equations to provide additional altitude compensation.

From the determined cylinder volume $V_a$, a model-based regression can be used to determine a relationship between a volume of air in a cylinder and intake valve closing volume (IVC) from the equation:

$$V_a = C_0 + C_1 * (V_{IVC} - V_{Res|Ti}) + C_2 * dV_{Res} + C_3 * \left(\frac{N}{1000}\right) * (V_{IVC} - V_{Res|Ti}) + C_4 * \left(\frac{N}{1000}\right) * dV_{Res} + C_5 * \left(\frac{T_i}{T_e}\right) * (V_{IVC} - V_{Res|Ti})$$

Where $V_a$ is the volume of air inducted into the cylinder, $C_0$-$C_5$ are stored, predetermined, regressed polynomial coefficients, $V_{IVC}$ is cylinder volume at intake valve closed, $V_{RES|Ti}$ is the residual volume evaluated at the cylinder inlet temperature, $dV_{res}$ is a residual pushback volume, i.e., the volume of exhaust residuals entering the intake manifold, N is engine speed, $T_i$ is intake manifold temperature, and $T_e$ is exhaust manifold temperature. Additional or fewer polynomial terms may be used in the regression based on the desired curve fit and strategy complexity. The unknown value of $V_{IVC}$ can be solved from the above-mentioned regression to yield:

$$V_{IVC} = V_{Res|Ti} + \frac{\left(V_a - C_0 - \left(C_2 + C_4 \cdot \frac{N}{1000}\right) \cdot dV_{Res}\right)}{C_1 + C_3 \cdot \frac{N}{1000} + C_5 \cdot \left(\frac{T_i}{T_e}\right)}$$

The solution of $V_{IVC}$ is further supported by the following equations derived from cylinder residual estimation:

$$V_{Res} = V_{EVC} + \frac{(V_{IVO} - V_{EVC})}{\left[1 - \left(\frac{V_E}{V_I}\right) \cdot \left(\frac{A_E}{A_I}\right)\right]}$$

$$dV_{Res} = V_{Res} - V_{TDC}$$

$$V_{Res|Ti} = V_{Res} \cdot \left(\frac{T_i}{T_e}\right)$$

$$\frac{V_E}{V_I} = \sqrt{\frac{P_m + 1}{2}}$$

$$V_{TDC} = \frac{V_{Dcyl}}{(CR - 1)}$$

$$V(x) = \pi \cdot r^2 \cdot \left(L + \frac{s}{2} - \frac{s}{2} \cdot \cos(\Theta) - \sqrt{L^2 - \left(\frac{s}{2} \cdot \sin(\Theta)\right)}\right)$$

Where V(x) is the cylinder volume at crank angle $\Theta$ relative to top dead center of the respective cylinder, L is the length of a connecting rod, s/2 is the crank shaft offset where the connecting rod attaches to the crankshaft, relative to the centerline of the crank shaft, r is the cylinder radius, CR is the cylinder compression ratio, $V_{Dcyl}$ is cylinder displacement volume, $V_{TDC}$ is cylinder volume at top dead center, $V_E/V_I$ is the air velocity ratio across exhaust and intake valves, $A_E/A_I$ is the area ratio across exhaust and intake valves, $V_{RES}$ is the residual cylinder volume, $V_{IVO}$ is cylinder volume at intake valve opening, $V_{EVC}$ is cylinder volume at exhaust valve closing, and $V_{TDC}$ is cylinder volume at top dead center. Thus, cylinder volumes $V_{EVC}$ and $V_{IVO}$ can be determined by solving for V(x) at the respective EVC and IVO crank angles. Further, crank angle $\Theta$ can be solved where $V(x)=V_{IVC}$ to determine the location of IVC. Valve control commands can be output to electrical and/or mechanical valve actuators so that the desired cylinder air amount may be inducted. The routine proceeds to step 309.

In step 309, spark timing can be adjusted. In one example, spark timing can be determined by indexing one or more predetermined tables of spark angle command amounts. The final spark may be determined by summing the output of several tables that can be indexed by engine speed, engine temperature, air charge temperature, and the amount of air in a cylinder, for example. After commanding the desired spark angle the routine exits.

Figure 4:
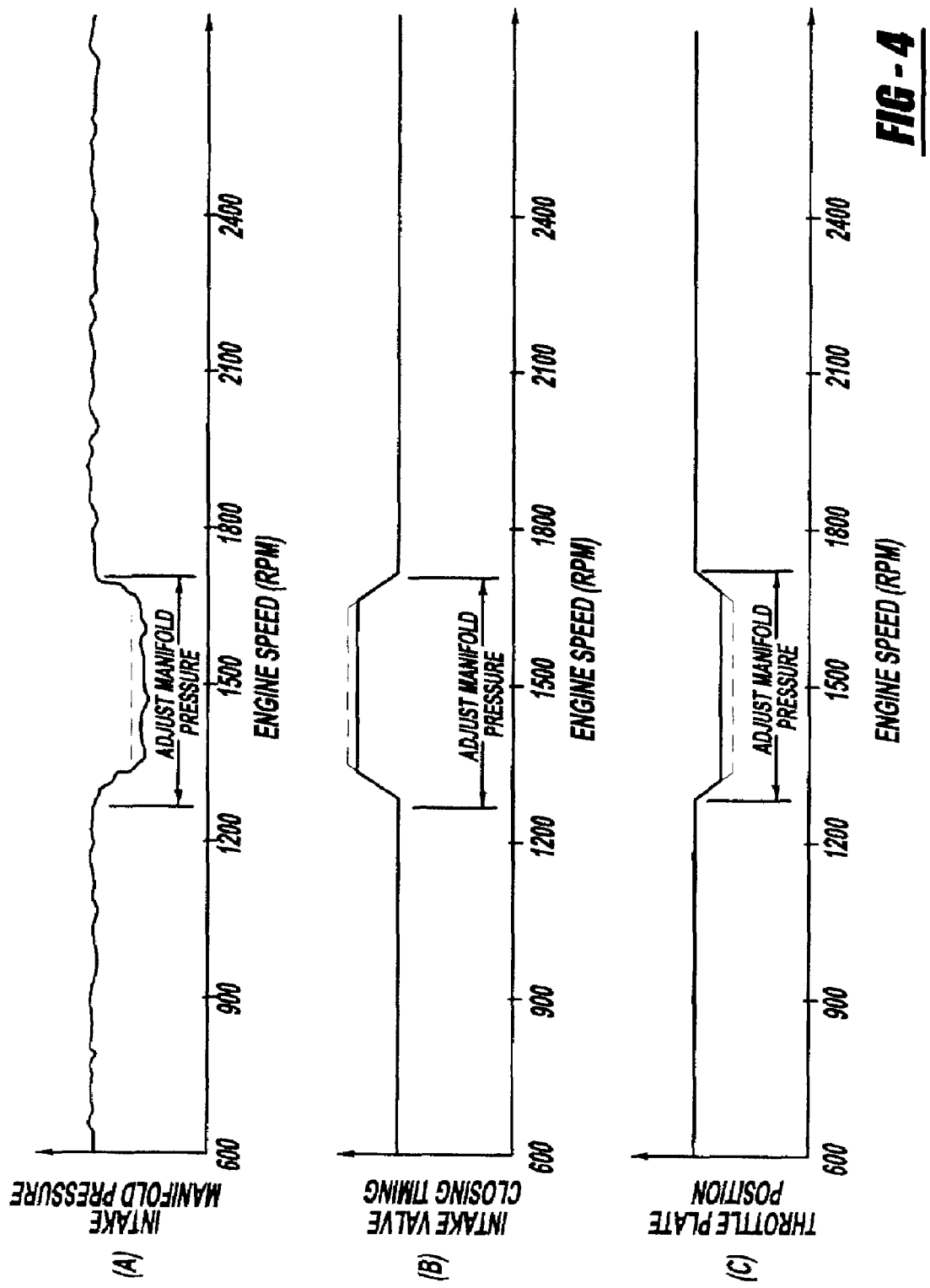
FIG. 4 is a plot showing signals of interest for one example of intake manifold pressure control.

Referring to FIG. 4, a plot of signals for one example of intake manifold pressure control is shown. The figure illustrates an example of manifold pressure control using the method of FIG. 3 when a substantially constant driver torque demand is requested as engine speed is varied. That is, the manifold pressure is varied as engine speed varies. This type of strategy can allow an engine controller to control intake and exhaust manifold scavenging in an engine having a variable event valvetrain. Similar conditions may be encountered during shifting, for example.

The figure shows that when the engine is operating at speeds below 1200 RPM and above 1800 RPM the intake manifold pressure (subplot (a)) is held substantially constant. Between 1200 RPM and 1800 RPM the manifold pressure is reduced to control scavenging between the intake and exhaust manifolds, for example. However, scavenging and other engine speed dependencies that may be influenced by intake manifold pressure may occur at different engine speeds for different engines, therefore the speed range shown is for illustration purposes only and is not meant to limit the scope or breadth of the description. Also, it is possible, although not shown in this example, to vary manifold pressure in response to fuel efficiency, brake boost, crankcase ventilation, and fuel vapor purge requests, for example.

The intake manifold pressure can be adjusted by changing the throttle position (subplot (c)) and/or intake valve timing (subplot (b)). As the throttle position is reduced, altering the density of air in the intake manifold, intake valve opening duration may be increased so that the inducted cylinder air amount remains substantially constant. Alternatively, the intake valve timing and/or timing and opening duration may be altered so that the cylinder air amount remains substantially constant.

The dashed lines in each of the subplots represent example adjustments for altitude compensation. At altitude, the pressure in the exhaust manifold may be lower so that scavenging between the intake and exhaust manifold may begin at a lower intake manifold pressure. Therefore, at altitude the intake manifold pressure can be adjusted to compensate for the lower exhaust pressure.

Note: intake valve timing and duration may be adjusted to reduce the influence of volumetric efficiency on the inducted cylinder air charge as well as to compensate for throttling.

Figure 5:
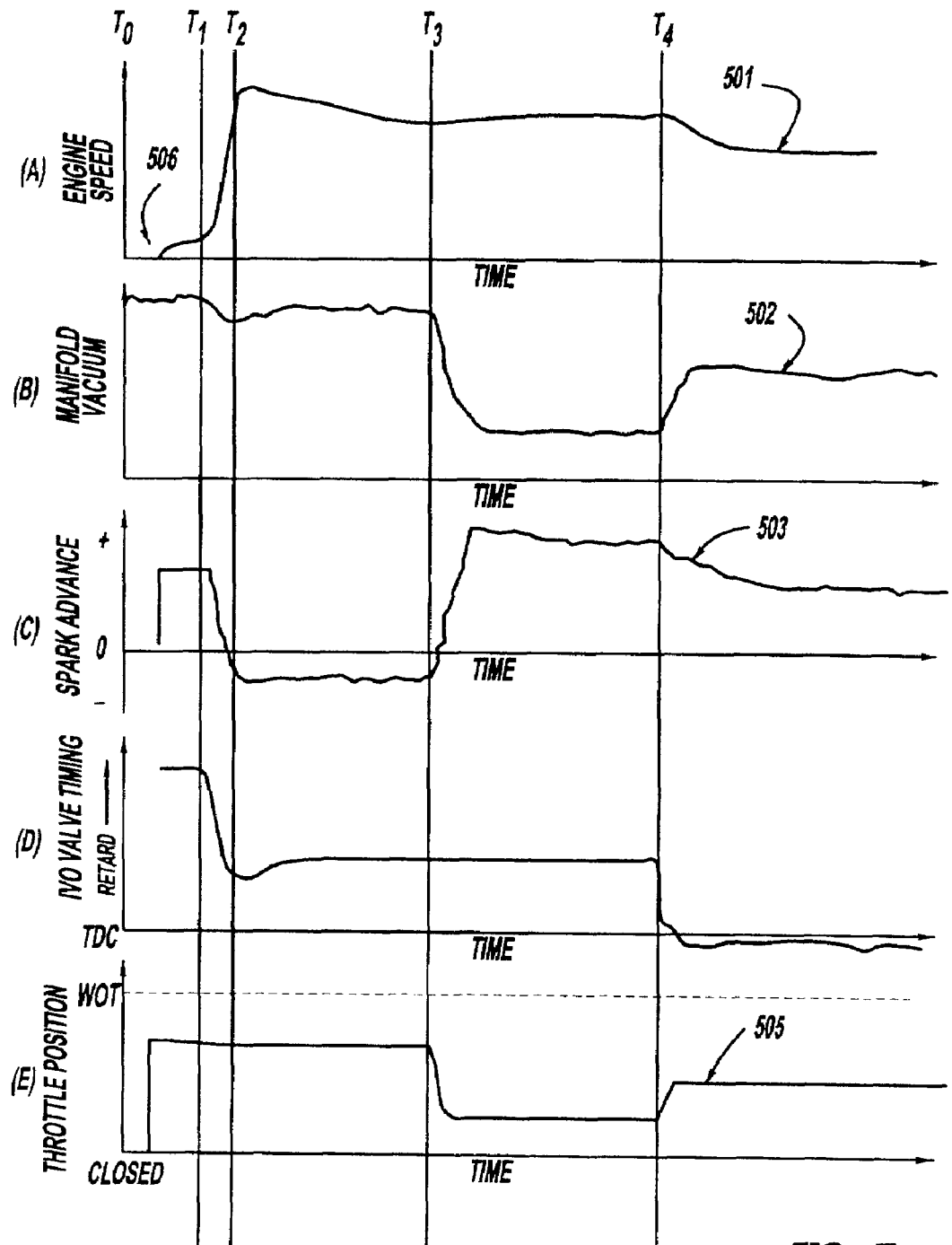
FIG. 5 is a plot showing signals of interest during an example starting sequence of an engine having a variable event valvetrain.

Referring to FIG. 5, a plot showing signals of interest during an example starting sequence of an engine having a variable event valvetrain is shown. Vertical lines $T_0$-$T_4$ represent different phases in a starting sequence. The duration of the respective intervals may change in response to engine operating conditions and are shown for illustration purposes only and are not meant to limit the scope or breadth of the description. The lines extend through all five subplots so that the relationships between signals can be shown.

The trajectory of engine speed is shown in subplot (a). The sequence begins a $T_0$ where the engine is stopped. Between $T_0$ and $T_1$ engine cranking and fuel delivery (not illustrated) commence, in response to a request to start the engine at location 506. The engine begins combustion and accelerates up to operating speed (run-up) between $T_1$ and $T_2$. Between $T_2$ and $T_3$ the engine is operated at an elevated speed so that an increased amount of heat may be transmitted from the engine to a catalyst. The efficiency of a catalyst may be increased by providing heat to the catalyst, at least under some conditions. From $T_3$ to $T_4$ the engine is operated so that engine speed is elevated and so that heat from combustion may be more readily transferred to the engine and engine coolant. In other words, the number of combustion events can be increased over a time interval so that the engine and/or catalyst may be more rapidly heated. In this way, the engine can be operated so that heat from combustion may first warm a catalyst, thereby reducing emissions, and then the combustion heat may be used to warm the engine, thereby improving engine fuel efficiency, reducing feed gas emissions (combustion products exhausted from the cylinders), and improving cabin warm-up. After $T_4$ the engine speed can be reduced and the engine operated so that the net work of the engine may be improved.

Subplot (b) shows the progression of manifold pressure throughout the example start sequence. Initially, manifold pressure is at an elevated level indicating that the manifold may be at or near atmospheric pressure. The figure shows that as the engine speed increases, manifold pressure falls. The pressure drop may be due to the air cleaner and/or restrictions within the air induction system, for example. During the catalyst warming period ($T_2$-$T_3$) manifold pressure stabilizes at a pressure near ambient pressure so that the inducted cylinder air amount can be elevated. By increasing the cylinder air amount and the engine speed, the mass (combusted fuel and air mixture) flow rate of heated exhaust gas encountering the catalyst can be increased, thereby increasing the heating of the catalyst. The time duration between $T_2$ and $T_3$ may be determined by a timer, driver demand torque, a catalyst temperature model, or by the output of a temperature sensor located in or near the catalyst. Between $T_3$ and $T_4$ the manifold pressure is lowered to improve combustion stability while the engine temperature is increasing. The lower intake manifold pressure allows the spark to be further advanced so that the cylinder temperature may be increased. After $T_4$ the manifold pressure may be controlled to a value where engine efficiency may be increased, for example.

Spark advance during this example start is illustrated by subplot (c). Spark in the + direction represents spark in advance of TDC compression while spark in the— direction represents spark retarded from TDC compression. The figure shows spark being set to a predetermined value in response to a request to start the engine. During engine run-up spark can be retarded as the engine speed increases so that spark and valve timing, including opening duration, may be used to control engine torque during run-up. Between times $T_2$ and $T_3$ the engine reaches a desired operating idle speed where the mass flow rate through the engine is increased above nominal idle conditions. The mass flow can be increased by increasing the inducted air mass and by elevating the engine idle speed. Engine torque can be controlled during this increased mass flow rate region by retarding the spark after TDC as shown in the figure. After the catalyst is heated to a desired temperature the spark can be advanced to the engine knock limit or until a level of engine torque is produced by the desired air mass, between $T_3$ and $T_4$ for example. By advancing the spark, combustion can be initiated earlier in the cylinder cycle, thereby increasing the time the combusted gases are in the cylinder. Further, the exhaust valve opening time may be retarded (e.g., beyond bottom-dead-center (BDC) of the exhaust stroke) to extend the time heat can be transferred from combusted gases to the cylinder walls and to the engine. Beyond $T_4$ spark can be adjusted to increase net engine torque, in one example, or spark can be adjusted to a position retarded from minimum spark for best torque (MBT) so that spark can be advanced or retarded to control engine idle speed, for example.

Subplot (d) shows engine valve timing being adjusted during a start so that combustion stability (one measure of combustion stability is the standard deviation of IMEP) and engine feed gas emissions may be improved. From $T_0$ to $T_1$ the exhaust timing can be held fixed. In one example, the exhaust valves are held closed until a first combustion event in the cylinder, and then the exhaust valve is opened early (e.g., in the range between 90° and 140° ATDC compression stroke) to increase the heat released to the catalyst. During this same period, the intake valve opening can be retarded in the range of 50°-120° ATDC of the intake stroke, for example. During engine run-up from $T_1$ to $T_2$ the intake valve opening time can be varied as a function of engine speed. This valve timing adjustment can be done to improve the cylinder air amount consistency and the charge motion of inducted air charge as the engine speed changes. For example, during late intake valve opening, a pressure differential can be created between the cylinder and the intake manifold. When the intake valve opens a near step change in flow across the intake valve can occur. Consequently, the pressure in the cylinder increases and can form a damped oscillatory response until the intake valve closes or until the higher frequency pressure oscillations are damped, see FIG. 7 for example. The frequency and rate of damping of the damped oscillatory response may be related to the motion of the piston which can be related to the speed of the engine. By adjusting the intake valve opening or closing position as a function of engine speed, the amount of air inducted into the cylinder can be controlled since the valve closing position may be made coincident with a desired cylinder pressure, even when the cylinder pressure is oscillating. Between $T_2$ and $T_4$ the valve opening location is shown continuing to change as engine speed changes. Alternatively, as mentioned above, the intake valve closing position may be changed with engine speed. After time $T_4$ the intake valve timing can be moved from late intake valve opening to an earlier timing, namely before TDC of the intake stroke. In addition, the illustrated valve timings represent valve timings when the engine is started at a specific engine temperature. However, the valve timings can also vary with engine temperature so that combustion stability and air-fuel mixing may be improved. In this way, the intake valve timings can change from one start to another start. Between $T_0$ and $T_4$ the exhaust valve timing can be set so that there is no overlap between the intake valve and the exhaust valve. This can allow the vacuum in the cylinder to be increased so that fuel vaporization may be improved. Alternatively, the exhaust valve timing may be such that positive valve overlap occurs when intake valve timing is set late. This can increase the time the exhaust gases are in the cylinder and may improve engine torque and/or efficiency.

In subplot (e) throttle position is shown. The x-axis represents a closed or minimal throttle position where the throttle opening area is reduced. A wide open throttle (WOT) position is identified next to the Y-axis to establish an upper bound of throttle position. From $T_0$ to $T_3$ the throttle position is shown substantially constant, except during initialization when the throttle can be pre-positioned from a closed position to an open position that may be based on barometric pressure, desired engine speed, desired engine torque, desired engine output heat, engine temperature, and ambient air temperature, for example. Alternatively, the throttle may be positioned in response to combinations and/or sub-combinations of the previously mentioned parameters. Further, the throttle preposition can range from the closed position to the WOT position depending on the throttle position calibration and/or strategy. Further still, throttle position can be controlled in response to engine events. For example, during an engine start the intake manifold pressure can change in response to the number of intake or induction events. By moving the position of the throttle in response to a number of engine events it may be possible to control manifold pressure so that it follows a desired trajectory or so that it remains substantially constant because the pressure in the intake manifold can be related to the outgoing (inducted air mass) and incoming (from the throttle) air mass. In one example, the throttle can be positioned in response to the counted number of intake strokes or induction events. The throttle command can be stored in a table indexed by the number of induction events or the throttle position may be the output of a discrete model having throttle commands that may be updated for each engine event. Of course, the type of engine event is not limited to induction events, and may include other types of engine related events such as combustion events, spark events, or exhaust events for example. After a predetermined number of events the throttle position control can be transitioned to a known method of throttle control (e.g., throttle position based on engine speed and desire cylinder air charge). In yet another example, the event based throttle control may update the throttle command in response to the observed manifold pressure during a start. In other words, during engine starting, at each throttle position update (at each engine event) the intake manifold pressure can be compared to a desired manifold pressure. If the manifold pressure varies by more than a predetermined amount then the throttle position may be updated by adjusting model parameters or by adjusting command values stored in the before-mentioned throttle table. In this way, any manifold pressure errors observed during a current engine start can be compensated during a subsequent engine start by adjusting the event based throttle commands. It is also possible to adjust the throttle position as a function of ambient temperature and/or pressure from modeling or empirically determined data so that throttle position may be adjusted by a multiplier, for example.

Continuing with FIG. 5, in the period from $T_3$ to $T_4$ the throttle opening can be reduced so that the intake manifold pressure may be reduced to improve combustion stability during the engine heating period. After $T_4$ the throttle opening can be increased so that engine pumping work may be reduced.

Between $T_0$ and $T_4$ the engine may be operated using late intake valve opening and a lean air-fuel mixture so that emitted hydrocarbons may be reduced and so that the amount of time it takes for a catalyst to reach operating temperature may be reduced. After the catalyst and/or engine reach a desired operating temperature the engine air-fuel ratio may go to a stoichiometric air-fuel mixture.

Note: It is possible for an operator to request torque during a start which may alter the starting sequence. For example, if the operator attempts to drive away between $T_2$ and $T_3$ spark can be advanced and the valve timing may be adjusted to an earlier timing (e.g., before TDC intake), in response to the driver torque request, so that the engine torque may be increased to accelerate the vehicle. Further, the throttle position and manifold vacuum may be controlled to provide a desired portion of combustion energy to catalyst heating and another portion of combustion energy to engine torque generation. Further still, the illustrated timing sequences are one example and are not intended to limit the scope or breadth of the present disclosure. For example, the time between $T_2$ and $T_3$ may be increased or decreased in response to engine operating conditions.

Figure 6A:
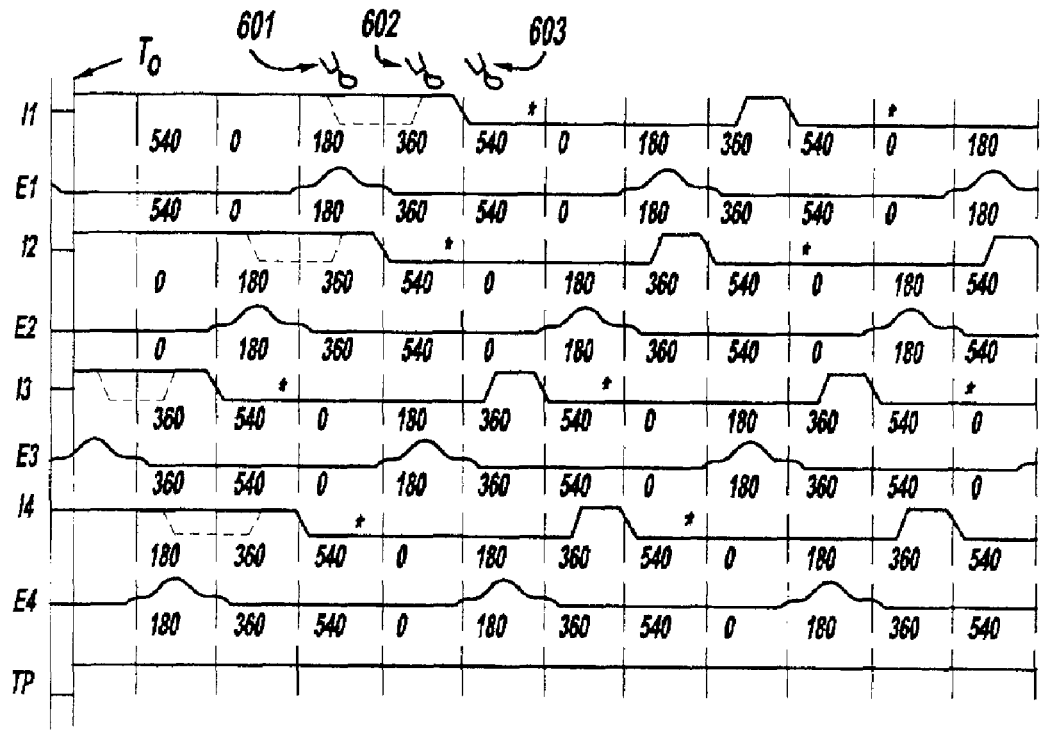
FIGS. 6a and 6b are plots that illustrate some signals of interest during an example start of an internal combustion engine.

Referring to FIG. 6a, is a plot that illustrates some signals of interest during an example start of an internal combustion engine. In particular, intake and exhaust valve timing for a simulated start of a four cylinder engine is shown. In addition, the position of a throttle plate located upstream of an intake manifold is also shown.

The figure shows example signals for an engine having electrically actuated intake valves and mechanically actuated exhaust valves. However, it is also possible to provide similar valve sequences with electrical actuated intake and exhaust valves, or using mechanically actuated intake and exhaust valves that are designed to be deactivated in an open or closed position. Intake valve timing sequences are labeled I1-I4 and exhaust valve timing sequences are labeled E1-E4. The timing of the x-axis for each cylinder valve event is illustrated in engine rotational degrees relative to top-dead-center of the compression stroke of the respective cylinder.

At time $T_0$ a request to start the engine is initiated by the driver or by a vehicle system (e.g., a hybrid powertrain control module). At this time, the electrically actuated valves are shown being commanded from a deactivated neutral position to an open position. However, some electrically actuated valve designs may place valves in an open or closed position when deactivated, but irrespective of the deactivation state, the valves can be commanded to a partially or fully open state. Further, the intake valve may remain in a neutral mid position until the intake stroke of the respective cylinder occurs, or alternatively, the valve may be opened after a time or engine rotation delay (i.e., opened after a number of cylinder strokes or crank angle degrees).

Continuing with FIG. 6a, cylinder one intake valve is shown being held open during the first possible intake stroke of cylinder one. This example illustrates valve timing for an engine controller that may not be capable of initially recognizing the position of the engine. In other words, the engine position sensors may not provide sufficient information to determine the position of the engine until a certain amount of engine rotation has occurred, for example. On the other hand, this figure can also illustrate that the engine controller may have determined that there may be an insufficient amount of time to inject fuel before the compression stroke is reached or that insufficient engine speed, that may be necessary for fuel vaporization, is present, for example. These conditions may occur for a port fuel injected engine. Therefore, the intake valve of cylinder one is shown held open until the second intake stroke of cylinder one occurs. In this example, the intake valve can be held open until some time during the intake or compression stroke. By holding the intake valve in an open position at least a portion of any residual hydrocarbons in the cylinder may be pushed into the intake manifold, instead of into the exhaust manifold. Consequently, the hydrocarbons expelled into the intake manifold may be subsequently combusted during a later combustion event so that tailpipe emissions may be reduced.

The dashed line illustrates an alternate example valve sequence where the intake valve can be closed prior to capturing a first air amount during an intake stroke that may be scheduled for combustion. Observe that the intake valves can and are being shown operating with and without regard to the position of the mechanically actuated exhaust valves, depending on control objectives. Specifically, before combustion begins (combustion is initiated by spark and is illustrated by *) intake valves are controlled without regard to engine position so that engine pumping work may be reduced and so that the amount of hydrocarbons expelled into the exhaust may be reduced. As previously mentioned, the intake valve timing for the respective cylinders can be determined relative to the exhaust valve timing for the respective cylinder. That is, since the exhaust valves are mechanically driven they have a predetermined relationship with the engine crankshaft position. This relationship can define the cycle of the cylinder. Therefore, at least during some conditions, it may be desirable to link the intake valve operation with the exhaust valve operation. That is, if a four stroke cylinder cycle is desired, it can be desirable to operate (open and/or close) the intake valve relative to the opening of an exhaust valve operating in four stroke cycle.

The valve timing for the remaining cylinders, cylinders 2-4, are shown for completeness. Valve timing for these cylinders is similar to that shown for cylinder one, but is moved in relation to the crankshaft position to smooth engine operation. In addition, the starting position of the engine can be arbitrary so that the duration of intake valve opening from start to start may vary between cylinders. That is, the timing illustrated in FIG. 6a is not meant to limit the scope or breadth of the description, but is one example of the valve timing strategy described herein. For example, during a first start cylinder number one intake valve may be open for three piston strokes while cylinder number three intake valve may be open for four piston strokes. During a second start, cylinder number one intake valve may be open for four strokes and cylinder number three intake valve may be open for one stroke.

The alternate valve timings and alternate types of fuel injection (e.g., port or direct) make it possible to provide several different fuel delivery methods. At location 601, a port injected engine may be configured to inject fuel on a close valve. This fuel injection timing may improve fuel vaporization during some conditions. Location 602 illustrates open valve injection for a port fueled engine. This fuel injection timing may improve charge mixing and fuel vaporization during some conditions. Location 603 illustrates an example of fuel delivery timing for a fuel charge that may be directly injected into a cylinder. Of course, these injection options may be available for subsequent combustion cycles of cylinder one and for the other cylinders as well, but are not illustrated. Valve timing and injection timing for the remaining cylinders follow the same pattern as that shown for cylinder one.

To further improve starting, intake valve timing is shown opening late in the intake stroke. That is, the intake valve opens at a crankshaft angle between 45° and 120° after top-dead-center of the intake stroke. The opening of the late opening intake valve timing can be varied as engine speed varies. Alternatively, the valve closing position may be varied as engine speed varies. Adjusting the valve timing in relation to engine speed can be useful during a start since the response of the air entering the cylinder can vary as described above. This valve sequence can increase combustion stability and may improve fuel vaporization.

Throttle position is shown at the lower trace signal in FIG. 6*a*, (TP). In response to the request to start the engine the throttle can be moved from a closed position to an open position. The throttle can be closed initially so that evaporative emissions of the engine may be reduced during the period when the engine is not operating. By opening the throttle and intake valves, hydrocarbons from the cylinder may be allowed to displace fresh air in the intake system. The vapors in the intake manifold may subsequently be inducted into the cylinder and combusted as the cylinders begin to operate. The throttle can be opened to reduce the intake manifold restriction while the pistons are pumping so that more hydrocarbons are allowed to flow into the intake manifold.

Spark timing is denoted by an * in FIG. 6*a*. Initially the spark timing is advanced to a position before top-dead-center and then is moved after top-dead-center during subsequent cylinder events. This spark timing can help to initially accelerate the engine. As engine speed reaches a predetermined value the spark can be retarded to control engine speed and emissions. Alternatively, spark may be retarded from the beginning of the sequence and the duration of the valve timing varied to control cylinder torque. For example, the intake valve opening duration and the intake valve opening or closing position may be adjusted during a start so that engine torque may be controlled.

Figure 6B:
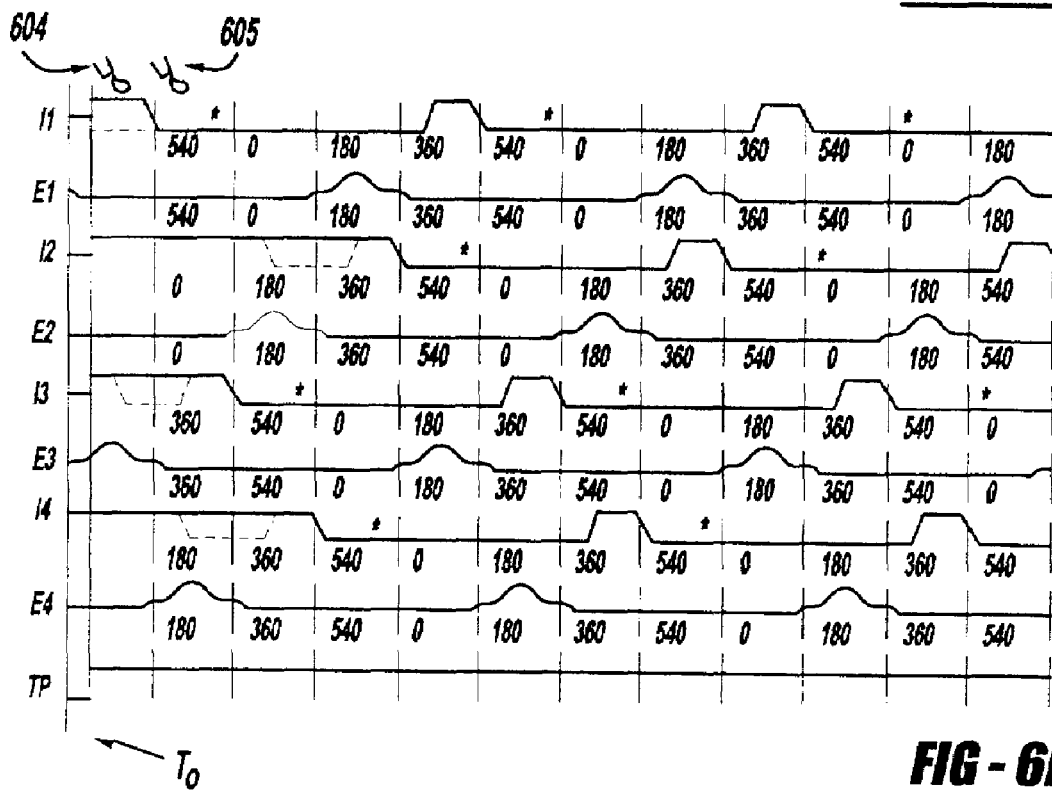

Referring to FIG. 6*b*, is a plot that illustrates some signals of interest during an example start of an internal combustion engine. The signals, signal labels, and engine timing references are similar to those illustrated in FIG. 6*a*, but this figure illustrates timing for an engine controller that can memorize the engine stopping position or that may be able to determine engine position before engine rotation begins. Because engine position may be known from the start, engine intake valves may be operated right in sequence with the mechanically driven exhaust valves. Cylinder number one for example, closes the intake valve in sequence with the mechanically drive exhaust valve of cylinder number one.

As described above, depending on the fuel injection method (e.g., port injection or direct injection) fuel may be injected on an open valve, closed valve, or directly into the cylinder when valves are closed. Label 604 shows injection on an open or closed valve. That is, depending on control objectives, the intake valve may be opened or closed following the request to start the engine. At label 605, fuel injection is shown when the intake valve is closed. This can be accomplished by injecting fuel directly into the cylinder. Further, the engine may be directly started such that a starter may not be required to start the engine. Namely, the fuel may be injected while the intake and exhaust valves are closed and then the air-fuel mixture may be combusted so that the increased cylinder pressure causes the engine to rotate. As described above, it is not necessary for the engine to start from the location illustrated in FIG. 6*b*, rather the engine may be started from any stopped position using the cylinder exhaust valve opening position as the reference to determine the first cylinder to combust during the start sequence.

Figure 7:
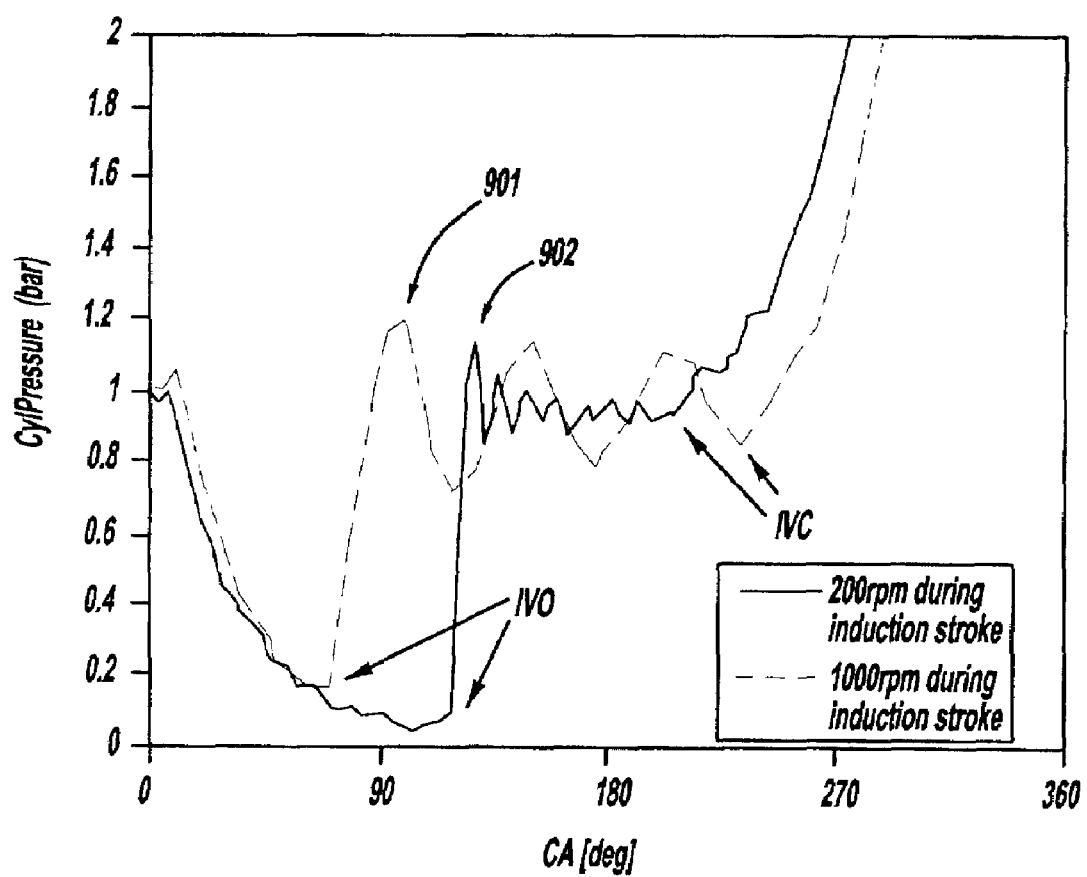
FIG. 7 is a plot of cylinder pressure during an induction stroke of an internal combustion engine.

Referring to FIG. 7, a plot of cylinder pressure during an induction stroke of an internal combustion engine is shown. Specifically, two pressure signals from two separate induction strokes are shown. The x-axis has units of crankshaft angle degrees measured relative to top-dead-center of the intake stroke. The y-axis has units of pressure measured in bar. Each of the intake valves are opened late in the intake stroke. That is, they are opened after top-dead-center of the intake stroke. Signal 901 shows cylinder pressure during an intake stroke of an engine operating at a speed of 1000 revolutions per minute (RPM). Signal 902 is similar to signal 901, but the intake valve is opened later, at approximately 115° and at an engine speed of 200 RPM. Each pressure trace begins from top-dead-center where cylinder pressure is nearly the same as atmospheric pressure. As the piston moves away from top-dead-center the cylinder pressure is reduced until the intake valve opens. The opening valve causes cylinder pressure to increase and the system response produces a damped pressure oscillation in the cylinder. The pressure responses have a similar shape but the rate of oscillation with respect to crankshaft position appears to be higher for the 902 (200 RPM) signal. However, the plot is expressed in terms of crankshaft degrees. If the signals are reviewed in terms of frequency content they are similar. Thus, by moving intake valve opening with respect to engine speed, the peaks and valleys can be moved so that a desired cylinder pressure is present at intake valve closing. On the other hand, it is also possible to move intake valve closing with respect to engine speed so that a desire cylinder air charge may be inducted.

Figure 8:
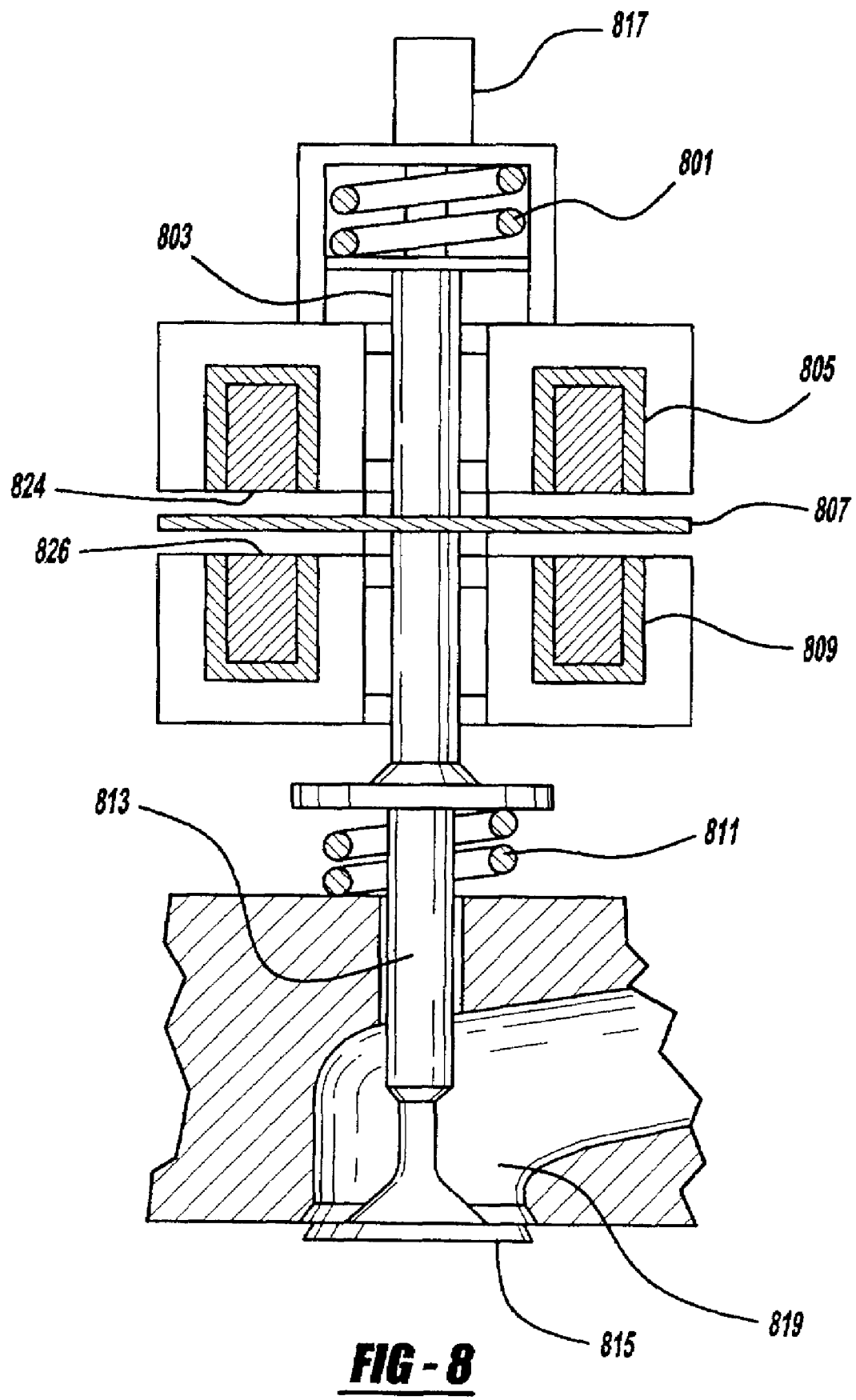
FIG. 8 is a schematic of an example electrically actuated valve.

Referring to FIG. 8, a schematic of an example electrically actuated valve is shown. The valve actuator is shown in a de-energized or neutral state (i.e., no electrical current is being supplied to the valve actuator coils). The electromechanical valve is comprised of an armature assembly and a valve assembly. The armature assembly is comprised of an armature return spring 801, a valve closing coil 805, a valve opening coil 809, an armature plate 807, a valve displacement transducer 817, and an armature stem 803. When the valve coils are not energized the armature return spring 801 opposes the valve return spring 811, valve stem 813 and armature stem 803 are in contact with each other, and the armature plate 807 is essentially centered between opening coil 809 and closing coil 805. This allows the valve head 815 to assume a partially open state with respect to the port 819. When the armature is in the fully open position the armature plate 807 is in contact with the opening coil magnetic pole face 826. When the armature is in the fully closed position the armature plate 807 is in contact with the closing coil magnetic pole face 824.

Figure 9:
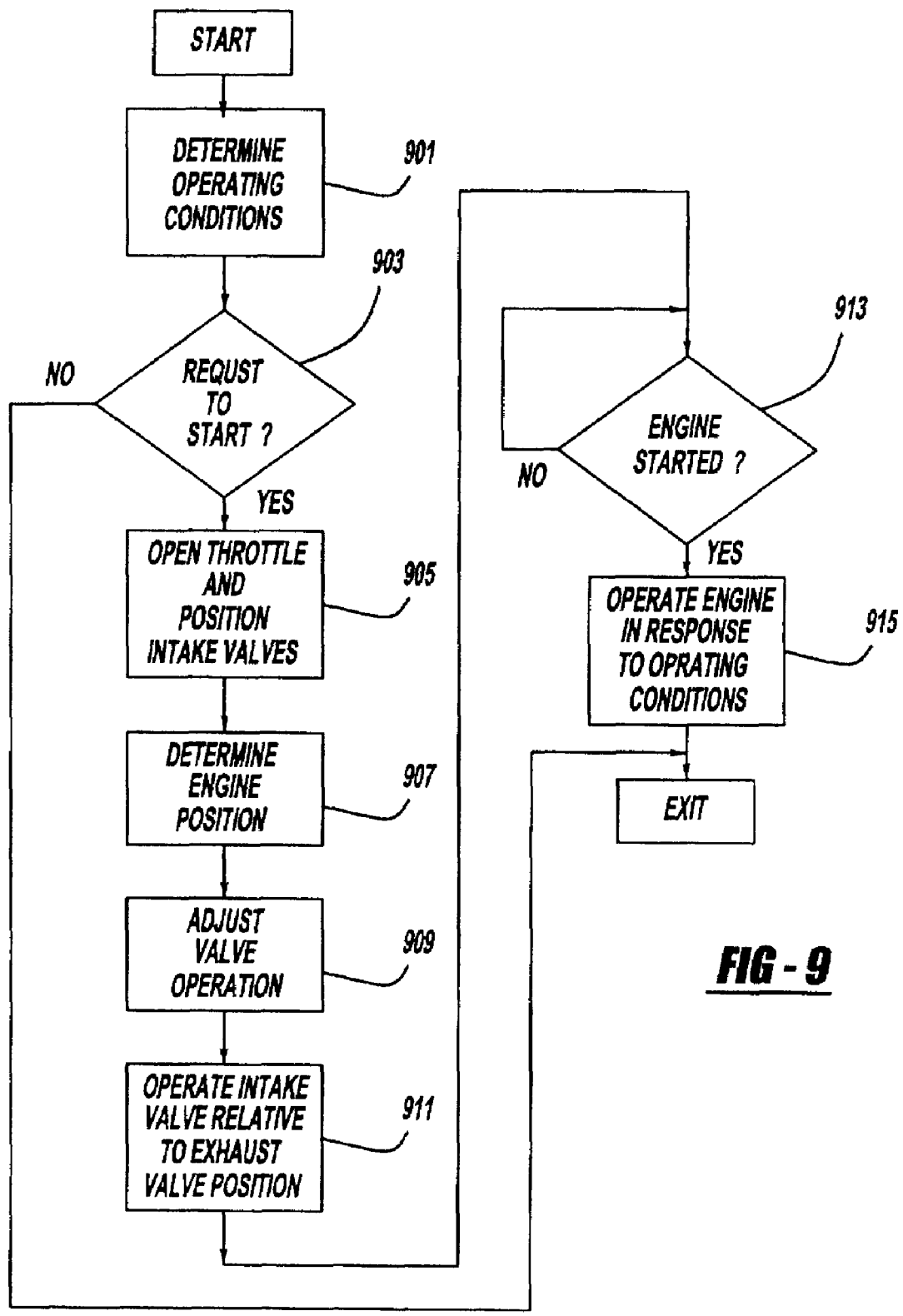
FIG. 9 is a flow chart of an example method to start an internal combustion engine.

Referring to FIG. 9 a flow chart of an example starting sequence is shown. The method described in FIG. 9 may be used to achieve the starting sequences illustrated in FIG. 5, 6a, and 6b. In step 901, engine operating conditions may be determined by interrogating sensor inputs or by inference. For example, engine speed, engine torque demand, engine inlet air temperature, engine coolant temperature, barometric pressure, cylinder air charge amount, and catalyst temperature may be determined or inferred by interrogating respective sensors. The routine proceeds to step 903.

In step 903, the routine determines if there is a request to start the engine. If so, the routine proceeds to step 905, if not, the routine proceeds to exit.

In step 905, the throttle located upstream of the intake manifold is opened and intake valves may be positioned for an impending start. The throttle can be moved from a closed position where it may be placed when the engine is stopped. The throttle can be set closed so that hydrocarbons in the engine may be trapped in the engine instead of allowing them to escape into the atmosphere. Further, opening the throttle may allow the cylinder volume to displace some of the intake manifold volume without significantly increasing the intake manifold pressure. By keeping the manifold pressure low, a low impedance path may be created between the cylinder and the intake manifold so that hydrocarbons may flow into the intake manifold rather than the exhaust manifold. In this way, hydrocarbons may be held in the engine until they can be combusted so that engine emissions may be reduced.

Intake valves may also be opened in step 905 so that hydrocarbon flow to the exhaust may be reduced before combustion is initiated in individual cylinders. As mentioned above, opening the intake valve may create a low restriction path into the exhaust manifold so that as the piston approached top-dead-center more of the cylinder volume may be displaced to the intake manifold rather than the exhaust manifold. The intake valves can be held open until a compression or exhaust stroke of a respective cylinder or the valve may be held open until the intake stroke or an early position in the compression stroke. By closing the intake valve during the compression or exhaust stroke the fuel may be injected on to a closed intake valve. On the other hand, holding the intake valve open until the intake or early part of the compression stroke allows open valve injection. Open valve or closed valve injection may be selected in response to engine operating conditions, for example.

The engine may begin to rotate with the assistance of a starter motor in step 905 or may be delayed until another step of the routine. However, if a particular engine controller is capable of determining engine position without rotating the engine, additional valve positioning may be provided before the engine begins to rotate. For example, for an engine controller that stores the engine stopping position in memory or that can determine engine position without rotating the engine, some intake valves may be closed while others may be set to the held open or partially open position before engine rotation and held open until an intake stroke of a first combustion event in the respective cylinder. The routine proceeds to step 907.

In step 907, engine position can be determined. As mentioned above, some engine control systems may determine engine position while the engine is stopped while others may need to monitor engine position signals as the engine rotates to determine engine position. By determining engine position, the exhaust valve opening events of the cam driven valves may also be determined since the exhaust valves open based on camshaft position and exhaust valve actuator command, unless the exhaust valves have been mechanically deactivated. The engine controller may then align intake valve opening events relative to the mechanically driven exhaust valve events. The routine proceeds to step 909.

In step 909, the operation of the intake valves may be adjusted. The engine operating conditions determined in step 901 can be used to adjust the intake valve timing and/or opening duration. For example, if the engine and/or exhaust system are below predetermined temperatures, the intake valve timing may be retarded so that the intake valve opens after top-dead-center of the intake stroke. In addition, the valve opening and closing positions may be further influenced by engine speed, barometric pressure, and driver torque demand, for example. The routine continues to step 911.

In step 911, the intake valves can be operated relative to the mechanically actuated exhaust valve timing. That is, after the engine position and respective exhaust valve opening position are determined the intake valves may be operated so that the cylinders operate in a predetermined stroke (e.g., two-four-six stroke) mode. In one example, the intake valves can be opened while the engine is rotating and the engine controller is determining engine position, and then after engine position is determined the intake valves can begin to operate synchronously with the exhaust valves. This sequence can allow the engine controller to determine engine position while reducing engine emissions. The routine proceeds to step 913.

In step 913, the routine determines if the engine has started. One method to determine if the engine has been started can be to compare the current engine speed to a predetermined value. For example, the engine cranking speed can be below a reference speed that represents a started engine. When the engine speed exceeds the reference speed the engine may be determined to be started. Further, the method may determine that the engine is running up (i.e., accelerating from cranking speed to operating speed) by determining that the engine speed is above the cranking or start speed but below the engine operating speed. If the engine is determined to be started the routine proceeds to step 915, if not, the routine waits until the engine is started or until the engine is requested to stop which can cause also cause the routine to exit.

In step 915, the engine and valves can be operated in response to engine operating conditions. In one example, the timing of the late intake valve opening can be varied with engine speed as the engine runs up and reaches operating speed. By adjusting the intake valve opening position, the intake valve can be used to compensate for pressure oscillation in the cylinder that may be caused by late intake valve opening. Alternatively, the intake valve closing location may be adjusted with respect to engine speed during engine run-up and cold idle. In addition, the valve opening timing may be adjusted in response to changes in barometric pressure. Further still, the intake valve timing can be adjusted for changes in engine temperature and catalyst temperature. Specifically, the intake valves can be transitioned from late opening to early opening after the engine and/or catalyst reach a predetermined temperature, for example.

Engine spark advance, throttle position, engine speed, and manifold vacuum can also be controlled with respect to valve timing and other engine operating conditions. Specifically, during a start where the engine temperature is below operating temperature, the engine controller can operate the engine so that heat to the catalyst increased and so that heat to the engine is increased. One embodiment is shown in FIG. 5, for example. The routine then exits.

Note: as previously mentioned different valve operating methods may be substituted for the example electrically actuated intake and mechanically actuated exhaust valves. The alternative valve types may be used with respect to the method of FIG. 9 such that the description of electrically actuated intake valves and mechanically actuated exhaust valves are used for illustration purposes and not intended to limit the scope or breadth of the description.

Thus, intake valve timing can be adjusted at the beginning of starting, for at least a portion of cylinders, without respect to exhaust valve timing and then subsequently adjusted with respect to exhaust valve timing. This can allow the engine controller to reduce engine emissions by reducing hydrocarbons that may be pumped into the exhaust system prior to combustion in a respective cylinder. For example, an engine may stop at a position where one cylinder is approaching or is on an exhaust stroke. If the intake valve of the cylinder were closed during this period, any residual hydrocarbons in the cylinder may be pumped from the cylinder to the exhaust. By opening the intake valve before or during the exhaust stroke, before a first combustion event in the cylinder, fewer hydrocarbons may be pumped into the exhaust.

As will be appreciated by one of ordinary skill in the art, the routine described in FIGS. 3 and 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to start an internal combustion engine, the method comprising:
adjusting the position of a throttle in response to a number of counted physical engine combustion events, said throttle located upstream of an intake manifold.

2. The method of claim 1 further comprising adjusting said throttle position in response to intake manifold pressure.

3. The method of claim 1 further comprising adjusting stored parameters to adjust throttle position during a subsequent engine start.

4. A method to start an internal combustion engine, the method comprising:
adjusting the position of a throttle in response to a number of counted engine events, said throttle located upstream of an intake manifold; and
transitioning to a second throttle control method after a predetermined number of said counted engine events.

5. The method of claim 4 further comprising comparing intake manifold pressure to a desired intake manifold pressure and adjusting said throttle position if said intake manifold pressure varies from a desired intake manifold pressure.

6. The method of claim 4 wherein said counted engine events are a counted number of combustion events.

7. The method of claim 4 further comprising adjusting said throttle position in response to intake manifold pressure.

\* \* \* \* \*